United States Patent
Baba et al.

(10) Patent No.: US 10,850,730 B2
(45) Date of Patent: Dec. 1, 2020

(54) CROSSING DETERMINATION APPARATUS

(71) Applicant: DENSO CORPORATION, Kariya (JP)

(72) Inventors: Takahiro Baba, Kariya (JP); Wataru Ike, Toyota (JP); Masayuki Shimizu, Numazu (JP)

(73) Assignee: DENSO CORPORATION, Kariya (JP)

( * ) Notice: Subject to any disclaimer, the term of this patent is extended or adjusted under 35 U.S.C. 154(b) by 239 days.

(21) Appl. No.: 16/082,377

(22) PCT Filed: Feb. 13, 2017

(86) PCT No.: PCT/JP2017/005189
§ 371 (c)(1),
(2) Date: Sep. 5, 2018

(87) PCT Pub. No.: WO2017/154471
PCT Pub. Date: Sep. 14, 2017

(65) Prior Publication Data
US 2019/0061751 A1    Feb. 28, 2019

(30) Foreign Application Priority Data
Mar. 7, 2016 (JP) ................. 2016-043625

(51) Int. Cl.
*G06K 9/00* (2006.01)
*B60W 30/095* (2012.01)
(Continued)

(52) U.S. Cl.
CPC ........ *B60W 30/0956* (2013.01); *B60W 40/04* (2013.01); *B60W 40/114* (2013.01); *G06K 9/00805* (2013.01); *G08G 1/166* (2013.01)

(58) Field of Classification Search
CPC ............. B60W 30/0956; B60W 40/04; B60W 40/114; B60W 2554/4042;
(Continued)

(56) References Cited

U.S. PATENT DOCUMENTS

| | | | |
|---|---|---|---|
| 6,269,307 | B1 | 7/2001 | Shinmura et al. |
| 2005/0073438 | A1* | 4/2005 | Rodgers ................. G08G 1/161 340/944 |

(Continued)

FOREIGN PATENT DOCUMENTS

| | | |
|---|---|---|
| JP | 2000-062553 A | 2/2000 |
| JP | 2014-089505 A | 5/2014 |
| JP | 2014-197325 A | 10/2014 |

*Primary Examiner* — Hunter B Lonsberry
*Assistant Examiner* — Daniel M. Robert
(74) *Attorney, Agent, or Firm* — Maschoff Brennan

(57) ABSTRACT

A crossing determination apparatus includes: an object detection unit which detects an object moving in a direction perpendicular to a traveling path of an own vehicle; a crossing speed calculation unit which calculates a crossing speed that is a speed at which the object detected by the objection detection unit is crossing a current traveling path of the own vehicle; a crossing determination unit which, when the crossing speed calculated by the crossing speed calculation unit is higher than a predetermined speed, determines that the object is crossing the traveling path of the own vehicle; and a yaw rate detection unit which detects a yaw rate of the own vehicle. The crossing determination unit corrects the crossing speed of the object or the predetermined speed based on the yaw rate detected by the yaw rate detection unit.

8 Claims, 3 Drawing Sheets

(51) Int. Cl.
*B60W 40/04* (2006.01)
*B60W 40/114* (2012.01)
*G08G 1/16* (2006.01)

(58) Field of Classification Search
CPC ....... B60W 60/00274; B60W 60/0027; B60W 60/0015; B60W 2554/00; B60W 2520/10; B60W 2520/14; B60W 30/095; B60W 30/0953; G06K 9/00805; G08G 1/166
See application file for complete search history.

(56) References Cited

U.S. PATENT DOCUMENTS

| | | | |
|---|---|---|---|
| 2008/0312832 A1* | 12/2008 | Greene | G08G 1/166 701/301 |
| 2013/0223686 A1* | 8/2013 | Shimizu | G08G 1/166 382/103 |
| 2014/0142839 A1* | 5/2014 | Kaminade | G08G 1/165 701/301 |
| 2014/0297171 A1 | 10/2014 | Minemura et al. | |

* cited by examiner

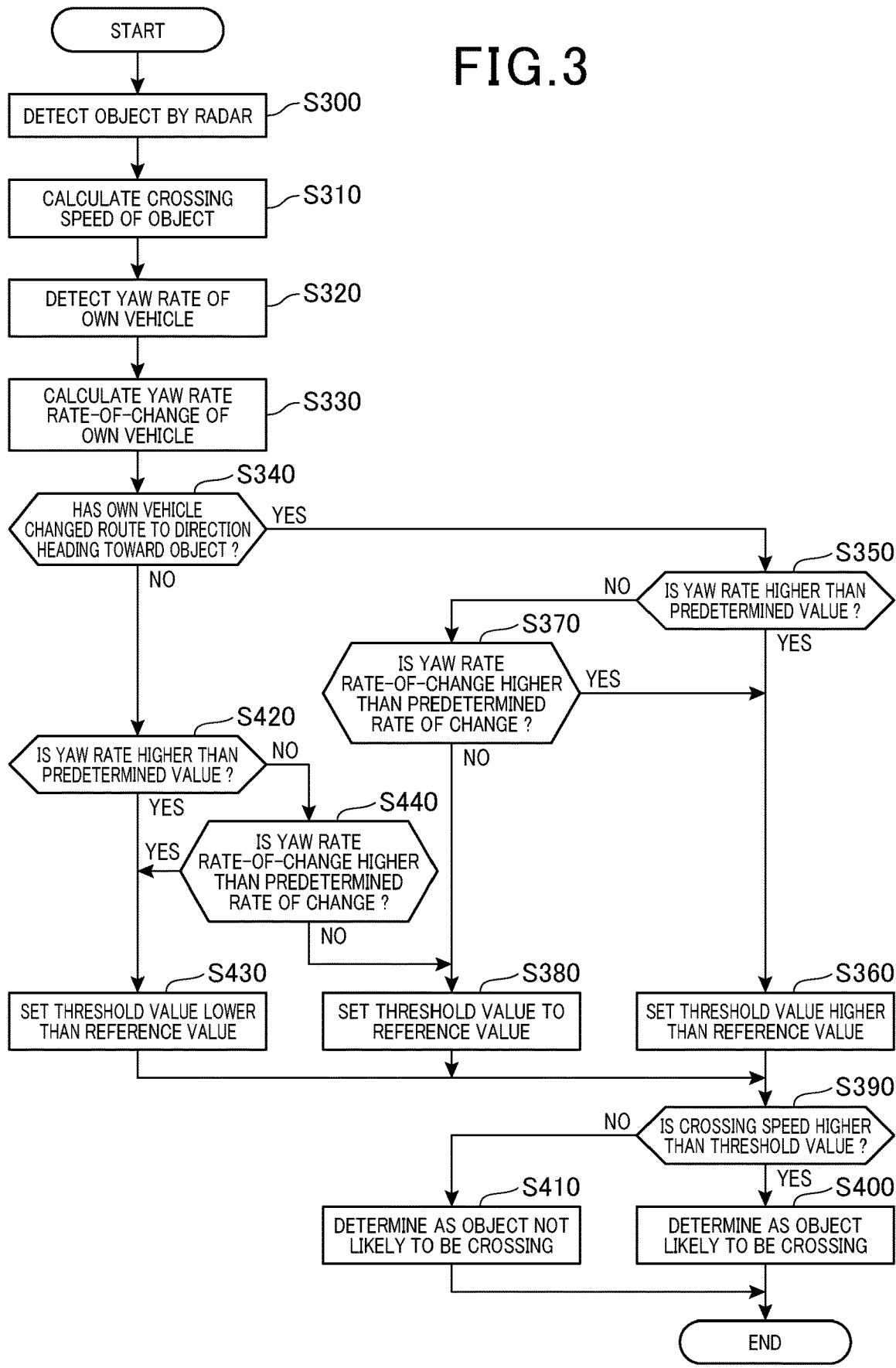

CROSSING DETERMINATION APPARATUS

CROSS REFERENCE TO RELATED APPLICATIONS

This application is a national stage application under 35 U.S.C. § 371(c) of PCT Application No. PCT/JP2017/005189, filed on Feb. 13, 2017, which is based on and claims the benefit of priority from earlier Japanese Patent Application No. 2016-043625, filed on Mar. 7, 2016, the description of which is incorporated herein by reference.

TECHNICAL FIELD

The present disclosure relates to a crossing determination apparatus which is mounted on a vehicle and determines whether an object is crossing a traveling path of the vehicle.

BACKGROUND ART

In recent years, along with advances in sensors, data processing, and the like, a driving assistance apparatus which prevents a collision occurring due to lateral entry of an object toward a traveling path of an own vehicle has come to be increasingly mounted on a vehicle. This driving assistance apparatus is known as a pre-crash safety (PCS) system which alerts the driver or operates an automatic brake.

In Patent Literature 1 (PTL 1), whether an object present in a direction crossing a traveling path of an own vehicle is attempting to cut across in front of the own vehicle is determined on the basis of the amount of movement of the object. Accordingly, the possibility of collision with only the object attempting to cut across in front of the own vehicle can be determined.

CITATION LIST

Patent Literature

[PTL 1] JP 2014-197325 A

SUMMARY OF THE INVENTION

However, in the technique disclosed in PTL 1, for example, when the own vehicle turns toward the object with respect to the current traveling path of the own vehicle, there is a risk that the amount of relative movement of the object in a direction crossing the traveling path of the own vehicle may increase and thus the amount of movement of the object may be calculated too high. In this case, there is a risk that an object that is not crossing will be erroneously determined as an object that may be crossing.

The present disclosure has been conceived to solve the aforementioned problem, and has a primary object to provide a crossing determination apparatus which is capable of reducing erroneous determinations that occur upon determination of crossing of an object in a situation where travel of an own vehicle affects the state of detecting an object present in a direction crossing a traveling path of the own vehicle.

The present disclosure relates to a crossing determination apparatus including: an object detection unit which detects an object moving in a direction perpendicular to a traveling path of an own vehicle; a crossing speed calculation unit which calculates a crossing speed that is a speed at which the object detected by the objection detection unit is crossing a current traveling path of the own vehicle; a crossing determination unit which, when the crossing speed calculated by the crossing speed calculation unit is higher than a predetermined speed, determines that the object is crossing the traveling path of the own vehicle; and a yaw rate detection unit which detects a yaw rate of the own vehicle. The crossing determination unit corrects the crossing speed of the object or the predetermined speed based on the yaw rate detected by the yaw rate detection unit.

The case is assumed in which there is an object moving in a direction perpendicular to the traveling path of the own vehicle and the own vehicle turns toward the object or turns in a direction away from the object. In this case, a change occurs in the relative speed between the own vehicle and the object in a lateral direction, and thus an error may occur in the crossing speed at which the object is crossing the current traveling path of the own vehicle. Therefore, on the basis of the yaw rate of the own vehicle detected by the yaw rate detection unit, the crossing determination unit corrects the crossing speed of the object or the predetermined speed. This enables a reduction of erroneous determinations upon determination of crossing of an object even when there is an error in the calculated crossing speed of the object in a situation where travel of the own vehicle affects detection of the crossing speed of an object present in a direction crossing the current traveling path of the own vehicle.

BRIEF DESCRIPTION OF THE DRAWINGS

These and other objects, advantages and features of the present disclosure will become more apparent from the following detailed description taken in conjunction with the accompanying drawings, in which:

FIG. 3 is a flowchart of control performed by a detection ECU according to another example.

DESCRIPTION OF EMBODIMENTS

Figure 1:
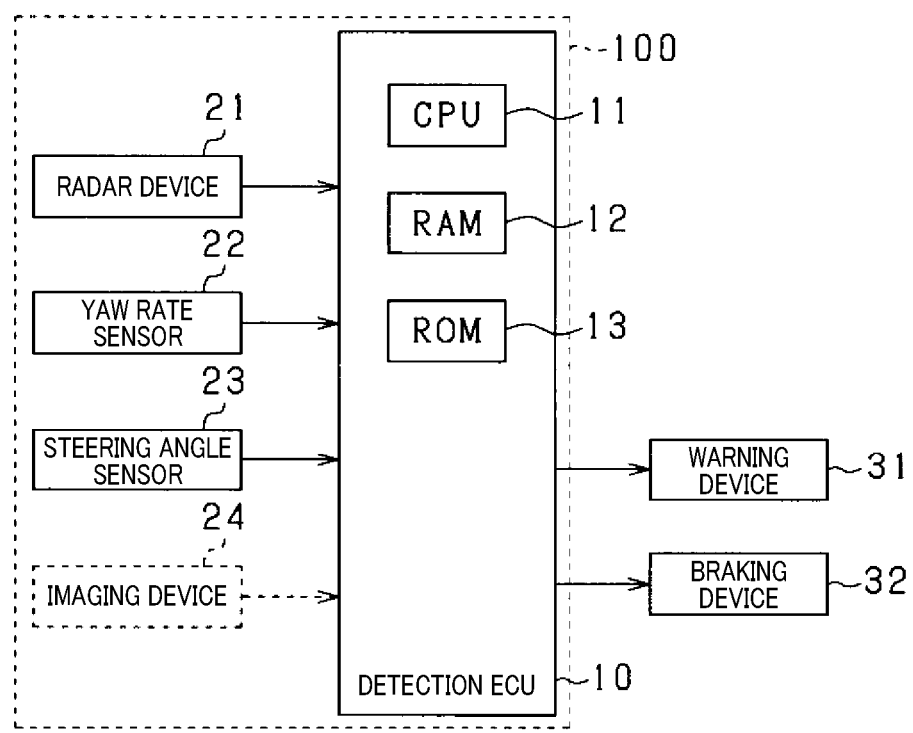
FIG. 1 is an outline configuration diagram of a driving assistance apparatus according to the present embodiment.

A driving assistance apparatus 100 shown in FIG. 1 is mounted on a vehicle (own vehicle), detects an object present around the own vehicle such as the front in the direction of travel thereof, and performs driving assistance control. This driving assistance control functions as a pre-crash safety (PCS) system which performs control to avoid collision with the object or reduce damage due to the collision. Furthermore, this driving assistance apparatus 100 functions as a crossing determination apparatus according to the present embodiment.

The driving assistance apparatus 100 includes a detection ECU 10, a radar device 21, a yaw rate sensor (corresponding to a yaw rate detection unit) 22, and a steering angle sensor 23.

The radar device 21 is, for example, a known millimeter-wave radar which transmits a high-frequency signal in a millimeter-wave band as transmission waves, is provided at a front end of the own vehicle, defines a region located in a predetermined angle as a sensing range in which an object can be sensed, and detects the location of an object present in the sensing range. Specifically, probe waves are transmitted with a predetermined cycle, and reflected waves are received by a plurality of antennas. The distance to the object is calculated using a point in time when the probe waves are transmitted and a point in time when the reflected waves are received. Furthermore, a relative speed (more specifically, a relative speed in a direction of travel of a vehicle) is calculated using the frequency of the waves reflected from the object which have changed by the Doppler effect. In addition, the direction of the object is calculated using a phase difference of the reflected waves received by the plurality of antennas. Note that if the location and the direction of the object are successfully calculated, the relative location (lateral location) of the object to the own vehicle can be identified. Thus, the radar device 21 corresponds to an object detection unit and a crossing speed calculation unit. In each predetermined period, the radar device 21 transmits the probe waves, receives the reflected waves, calculates the reflection location and the relative speed, and transmits the calculated reflection location and relative speed to the detection ECU 10.

The radar device 21 is connected to the detection ECU 10. The detection ECU 10 is a computer including a CPU 11, RAM 12, ROM 13, I/O unit, and so on. This detection ECU 10 implements these functions by the CPU 11 executing a program installed in the ROM 13. In the present embodiment, the program installed in the ROM 13 is a control program for performing a prescribed driving assistance process by detecting an object present in front of the own vehicle on the basis of information of the object detected by the radar device 21 (such as the calculated location and relative speed). This detection ECU 10 corresponds to a yaw rate rate-of-change calculation unit and a crossing determination unit.

In the present embodiment, the driving assistance process corresponds to a warning process in which the driver is informed of the presence of an object that may collide with the own vehicle and a braking process in which the brake is applied to stop the own vehicle. Therefore, the own vehicle includes a warning device 31 and a braking device 32 as safety devices that are driven according to a control command from the detection ECU 10.

The warning device 31 is, for example, a speaker or a display installed in the interior of the own vehicle. When the detection ECU 10 determines that time to collision (TTC) which is remaining time for the own vehicle to collide with a target has fallen below a first predetermined time and thus there is an increased probability of the own vehicle colliding with the object, the warning device 31 outputs a warning sound, a warning message, etc., according to a control command from the detection ECU 10 and thereby informs the driver of the danger of collision.

The braking device 32 is a stopping device that brakes the own vehicle. When the detection ECU 10 determines that the time to collision has fallen below a second predetermined time which is set shorter than the first predetermined time and thus there is an increased probability of the own vehicle colliding with the object, the braking device 32 is actuated according to a control command from the detection ECU 10. Specifically, the braking device 32 increases braking force applied through a braking operation of the driver (brake assistance function) or automatically brakes if the driver has not performed the braking operation (automatic brake function), for example.

Conventionally, whether an object moving in a direction perpendicular to the traveling path of the own vehicle is crossing the traveling path of the own vehicle has been determined (hereinafter referred to as crossing determination) on the basis of the amount of movement of the object. This crossing determination may be performed on the basis of the speed of an object present in a direction perpendicular to the traveling path of the own vehicle (hereinafter referred to as a crossing speed) instead of the amount of movement of the object.

When the own vehicle turns toward the object with respect to the current traveling path of the own vehicle, there is a risk that the amount of relative movement of the object in a direction crossing the traveling path of the own vehicle may increase and thus the amount of movement of the object may be calculated too high. This is also the case for the crossing speed of the object; there is a risk that the crossing speed of the object may also be calculated too high. Thus, in the abovementioned situation, if the crossing determination is performed on the basis of the amount of movement or the crossing speed of the object, there is a risk that an object that is not crossing the traveling path of the own vehicle may be erroneously determined as an object that is crossing the traveling path of the own vehicle.

Thus, the driving assistance apparatus 100 according to the present embodiment includes a yaw rate sensor a steering angle sensor 23. The yaw rate sensor 22 detects the angular speed (yaw rate) in a turning direction of the vehicle, and the steering angle sensor 23 detects the steering angle of the own vehicle; these sensors transmit the detected yaw rate and steering angle to the detection ECU 10.

The detection ECU 10 can determine, on the basis of information of the received steering angle and location information of the object detected by the radar device 21, that the own vehicle has changed the traveling path to a direction heading toward the object. When the detection ECU 10 determines that the own vehicle has changed the traveling path to a direction heading toward the object, whether there is a risk that the crossing speed of the object may be calculated too high can be determined on the basis of the magnitude of the yaw rate resulting from the change of the traveling path of the own vehicle. Furthermore, in consideration of a situation where the yaw rate is detected as being low, such as when the own vehicle starts turning, while it is assumed that the amount of movement or the crossing speed of the object will be calculated too high, the detection ECU 10 calculates the rate of change of the received yaw rate with the lapse of time (hereinafter referred to as a yaw rate rate-of-change). When the yaw rate rate-of-change exceeds a predetermined rate of change, the detection ECU 10 determines that there is a risk that the amount of movement or the crossing speed of the object may be calculated too high.

In the present embodiment, the crossing determination of an object in the traveling path of the own vehicle is performed on the basis of the crossing speed of an object moving in a direction perpendicular to the traveling path of the own vehicle. Specifically, when the crossing speed of the object is higher than a threshold value, the object is determined as crossing the traveling path of the own vehicle. At this time, the threshold value is set on the basis of the crossing speed according to the type of the object such as pedestrians, bicycles, two-wheeled motor vehicles, and four-wheeled motor vehicles. Note that instead of performing the crossing determination of the object on the basis of the crossing speed of the object, the crossing determination of the object may be performed on the basis of the amount of movement of the object with the lapse of time. Furthermore, another example to be described later can also be applied as appropriate.

At this time, the case is assumed in which the radar device 21 detects an object moving in a direction perpendicular to the traveling path of the own vehicle and the detection ECU 10 determines, by referring to the steering angle sensor 23, that the own vehicle has changed the traveling path to a direction heading toward the object, and determines, on the basis of the yaw rate, that there is a risk that the crossing speed of the object may be calculated too high. In this case, the threshold value to be used for the crossing determination of the object is re-set to a value higher than a reference value. Thus, even when the crossing speed of the object is calculated too high, the occurrences of erroneously determining the object as crossing the traveling path of the vehicle can be reduced.

Figure 2:
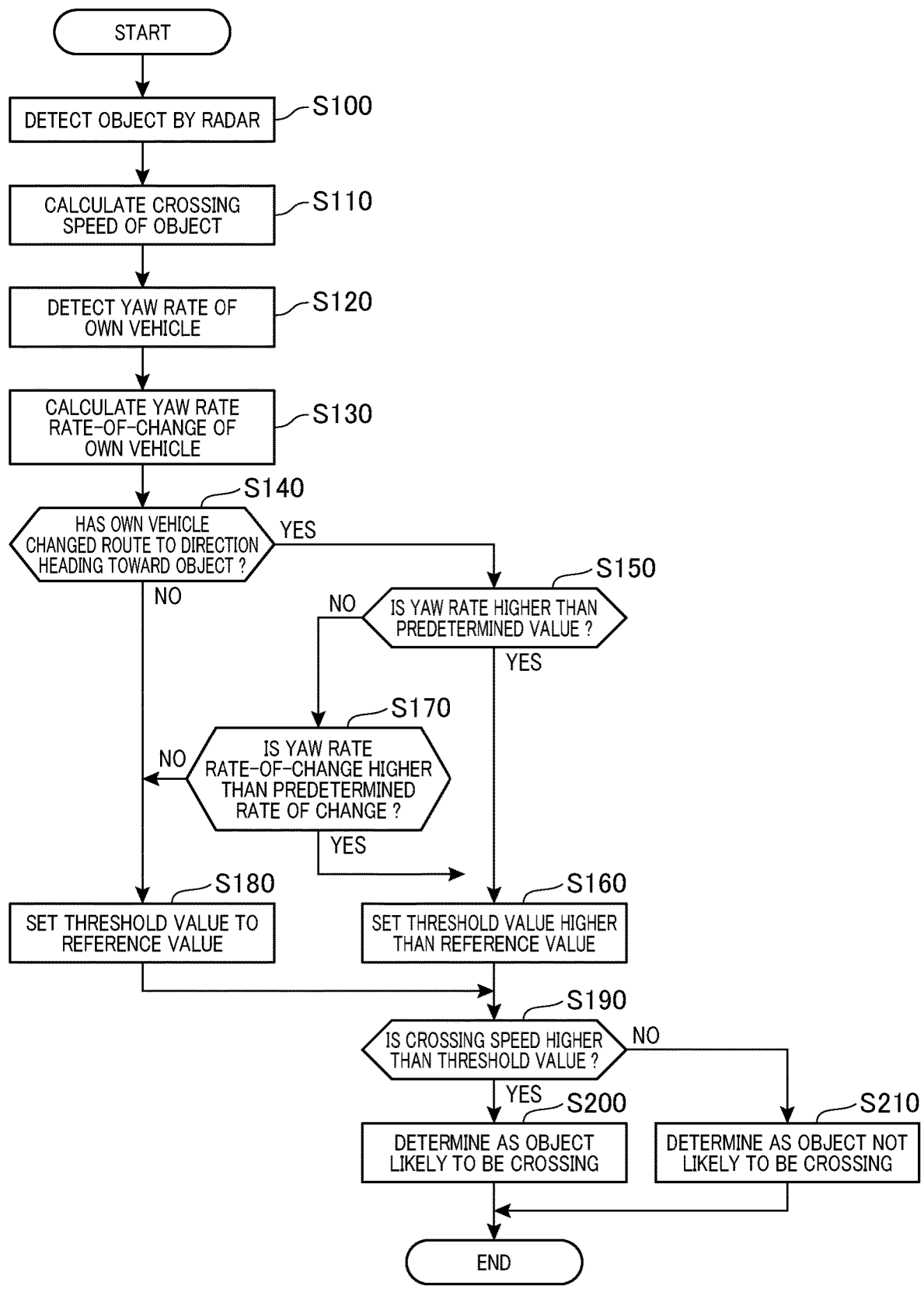
FIG. 2 is a flowchart of control performed by a detection electronic control unit (ECU) according to the present embodiment.

In the present embodiment, the detection ECU 10 performs a crossing determination process of FIG. 2 to be described later. The crossing determination process shown in FIG. 2 is repeatedly performed by the detection ECU 10 on a predetermined cycle during a period in which the detection ECU 10 is powered on.

First, in Step S100, the radar device 21 detects an object moving in a direction perpendicular to the traveling path of the own vehicle. Subsequently, in Step S110, the radar device 21 calculates the crossing speed of the object.

Furthermore, in Step S120, the yaw rate sensor 22 detects the yaw rate of the own vehicle. Subsequently, in Step S130, the yaw rate rate-of-change (yaw acceleration) is calculated from the detected yaw rate of the own vehicle.

In Step S140, whether the own vehicle has changed the traveling path to a direction heading toward the object detected by the radar device 21 is determined on the basis of the location information of the object detected by the radar device 21 and the information of the steering angle detected by the steering angle sensor 23. When the detection ECU 10 determines that the own vehicle has not changed the traveling path to a direction heading toward the object (S140: NO), the process proceeds to Step S180 to be described later. When the detection ECU 10 determines that the own vehicle has changed the traveling path to a direction heading toward the object (S140: YES), the process proceeds to Step S150.

In Step S150, whether the yaw rate detected by the yaw rate sensor 22 is higher than a predetermined value is determined. When the yaw rate is determined as being higher than the predetermined value (S150: YES), the process proceeds to Step S160 to be described later. When the yaw rate is determined as being lower than the predetermined value (S150: NO), the process proceeds to Step S170.

In Step S170, whether the yaw rate rate-of-change calculated in Step S130 is higher than a predetermined rate of change is determined. When the yaw rate rate-of-change is determined as being lower than the predetermined rate of change (S170: NO), the process proceeds to Step S180. In Step S180, the threshold value to be used for the crossing determination of the object is set to the reference value. Subsequently, the process proceeds to Step S190. When the yaw rate rate-of-change is determined as being higher than the predetermined rate of change (S170: YES), the process proceeds to Step S160. In Step S160, the threshold value to be used for the crossing determination of the object is set higher than the reference value. Subsequently, the process proceeds to Step S190 to be described later.

In Step S190, whether the crossing speed of the object calculated in Step S110 is higher than the threshold value is determined. When the crossing speed of the object is determined as being higher than the threshold value (S190: YES), the process proceeds to Step S200 in which the object is determined as being likely to cross the traveling path of the own vehicle, and thus the present control is ended. When the crossing speed of the object is determined as being lower than the threshold value (S190: NO), the process proceeds to Step S210 in which the object is determined as being not likely to cross the traveling path of the own vehicle, and thus the present control is ended.

With the abovementioned configuration, the present embodiment produces the following advantageous effects.

The threshold value to be used for the crossing determination of the object is corrected upwards on the condition that the own vehicle has turned from the current traveling path and is driving toward the object and the yaw rate detected by the yaw rate sensor 22 is higher than the threshold value. Thus, even when the crossing speed of the object is calculated too high, the occurrences of erroneously determining an object that is not crossing the traveling path of the vehicle as crossing the traveling path of the vehicle can be reduced.

When the time rate of change of the yaw rate is calculated, a change in the tuning angle of the own vehicle in a certain period can be taken into consideration. Thus, even in a situation where the yaw rate is detected as being low at the present moment such as at the beginning of turning of the own vehicle, but the yaw rate is expected to exceed a predetermined value, the threshold value can be increased.

The abovementioned embodiment can be implemented with the following modifications.

In the abovementioned embodiment, the radar device 21 detects a target. This does not need to be limited to the radar device 21; for example, an imaging device 24 may detect a target. Examples of the imaging device 24 include a stereo camera and a single-lens camera using a charge-coupled device (CCD) camera, a complementary metal-oxide semiconductor (CMOS) image sensor, or a near-infrared camera. Even in this case, the imaging device 24 can calculate the location information, the relative speed, etc., of the target on the basis of a captured image; thus, with this configuration, functions and advantageous effects similar to those in the abovementioned embodiment are obtained.

In the abovementioned embodiment, in a situation where the own vehicle turns toward the object and there is a risk that the crossing speed of the object may be calculated too high, the threshold value to be used for the crossing determination is increased for correction. However, the threshold value to be used for the crossing determination does not necessarily need to be corrected; for example, the crossing speed of the object may be corrected while the threshold value remains fixed. Specifically, in a situation where the own vehicle turns toward the object and the crossing speed of the object is expected to be calculated too high, the crossing speed of the object may be corrected to be low while the threshold value to be used for the crossing determination remains fixed.

In the abovementioned embodiment, when the yaw rate of the own vehicle is lower than the predetermined value, whether the yaw rate rate-of-change is higher than the predetermined rate of change is further determined. Whether this yaw rate rate-of-change is higher than the predetermined rate of change does not necessarily need to be determined.

In the present embodiment, whether the own vehicle has changed the traveling path to a direction heading toward the object detected by the radar device 21 is determined on the basis of the location information of the object detected by the radar device 21 and the information of the steering angle detected by the steering angle sensor 23. However, the information of the steering angle detected by the steering angle sensor 23 does not necessarily need to be used. For example, a rate of turn with respect to the direction of travel of the own vehicle may be calculated from the yaw rate of the own vehicle detected by the yaw rate sensor 22, and whether the own vehicle has changed the traveling path to a direction heading toward the object may be determined on the basis of the calculated rate of turn.

In the present embodiment, when the detection ECU 10 determines, on the basis of the location information of the object detected by the radar device 21 and the information of the steering angle detected by the steering angle sensor 23, that the own vehicle has not changed the traveling path to a direction heading toward the object, the threshold value to be used for the crossing determination is set to the reference value. However, when the own vehicle turns away from the object with respect to the current traveling path of the own vehicle, the relative speed of the object in a direction crossing the traveling path of the own vehicle is reduced and, accordingly, there is a risk that the crossing speed of the object may be calculated too low. In order to handle this case, when the own vehicle turns away from the object with respect to the current traveling path of the own vehicle and the yaw rate is higher than the threshold value, the threshold value to be used for the crossing determination may be set lower than the reference value.

FIG. 3 is the flowchart in FIG. 2 with partial modifications. Specifically, when the result of determination in Step S340 which is the same process as Step S140 in FIG. 2 is negative, the process proceeds to Step S420 which is a new step. Step S420 is a process corresponding to Step S350 which is the same process as Step S150 in FIG. 2. Specifically, whether the yaw rate of the own vehicle is higher than a predetermined value is determined. When the yaw rate of the own vehicle is determined as being higher than the predetermined value (S420: YES), the process proceeds to below described Step S430 which is a new step. When the yaw rate of the own vehicle is determined as being lower than the predetermined value (S420: NO), the process proceeds to Step S440 which is a new step. Step S440 is a process corresponding to Step S370 which is the same process as Step S170 in FIG. 2. Specifically, whether the yaw rate rate-of-change is higher than a predetermined rate of change is determined. When the yaw rate rate-of-change is determined as being lower than the predetermined rate of change (S440: NO), the process proceeds to Step S380 which is the same process as Step S180 in FIG. 2. When the yaw rate rate-of-change is determined as being higher than the predetermined rate of change (S440: YES), the process proceeds to Step S430. In Step S430, the threshold value to be used for the crossing determination is set lower than the reference value. Subsequently, the process proceeds to Step S390 which is the same process as Step S190 in FIG. 2.

The processes in the other steps, Steps S300, 310, 320, 330, 360, 400, and 410 in g are the same as those in Steps S100, 110, 120, 130, 160, 200, and 210 in FIG. 2.

When the control according to another example is executed, the threshold value to be used for the crossing determination is set lower than the reference value in a situation where the own vehicle turns away from the object and the crossing speed of the object is expected to be calculated too low. Thus, the occurrences of erroneously determining an object that is crossing the traveling path of the vehicle as not crossing the traveling path of the vehicle can be reduced.

The present disclosure is described in accordance with the embodiment, but the present disclosure should in no way be construed as being limited to the embodiment, the configuration, etc. The present disclosure encompasses various variations and modifications made within the range of equivalence. In addition, various combinations and forms, and furthermore, other combinations and forms including only one element of these and elements no less than or no more than these are also included in the scope or concept range of the present disclosure.

The invention claimed is:

1. A crossing determination apparatus comprising:
   an object detection unit which detects an object moving in a direction perpendicular to a traveling path of an own vehicle;
   a crossing speed calculation unit which calculates a crossing speed that is a speed at which the object detected by the objection detection unit is crossing a current traveling path of the own vehicle;
   a crossing determination unit which, when the crossing speed calculated by the crossing speed calculation unit is higher than a predetermined speed, determines that the object is crossing the traveling path of the own vehicle; and
   a yaw rate detection unit which detects a yaw rate of the own vehicle, wherein
   the crossing determination unit corrects the crossing speed of the object or the predetermined speed based on the yaw rate detected by the yaw rate detection unit,
   the crossing determination apparatus, further comprising
   a yaw rate rate-of-change calculation unit which calculates a time rate of change of the yaw rate detected by the yaw rate detection unit, wherein
   the crossing determination unit corrects the speed of the object or the predetermined speed based on the yaw rate detected by the yaw rate detection unit and the time rate of change calculated by the yaw rate rate-of-change calculation unit.

2. The crossing determination apparatus according to claim 1, wherein
   the crossing determination unit corrects the crossing speed or the predetermined speed to reduce a probability of determining the object as crossing on a condition that the own vehicle turns toward the object with respect to the current traveling path and the time rate of change calculated by the yaw rate rate-of-change calculation unit is higher than a predetermined rate of change.

3. The crossing determination apparatus according to claim 1, wherein
   when the own vehicle turns in a direction away from the object, the crossing determination unit is more likely to determine that the object is crossing the traveling path of the own vehicle than when the own vehicle does not turn in the direction away from the object.

4. The crossing determination apparatus according to claim 1, wherein
   the crossing determination unit corrects the crossing speed or the predetermined speed to reduce a probability of determining the object as crossing on a condition that the own vehicle turns toward the object with respect to the current traveling path and the yaw rate detected by the yaw rate detection unit is higher than a predetermined value.

5. A crossing determination apparatus comprising:
   an object detection unit which detects an object moving in a direction perpendicular to a traveling path of an own vehicle;
   a crossing speed calculation unit which calculates a crossing speed that is a speed at which the object detected by the objection detection unit is crossing a current traveling path of the own vehicle;
   a crossing determination unit which, when the crossing speed calculated by the crossing speed calculation unit is higher than a predetermined speed, determines that the object is crossing the traveling path of the own vehicle; and a yaw rate detection unit which detects a yaw rate of the own vehicle, wherein the crossing determination unit corrects the crossing speed of the object or the predetermined speed based on the yaw rate detected by the yaw rate detection unit, the crossing determination apparatus, further comprising a yaw rate rate-of-change calculation unit which calculates a time rate of change of the yaw rate detected by the yaw rate detection unit, wherein the crossing determination unit corrects the crossing speed or the predetermined speed to reduce a probability of determining the object as crossing on a condition that the own vehicle turns toward the object with respect to the current traveling path and the time rate of change calculated by the yaw rate rate-of-change calculation unit is higher than a predetermined rate of change.

6. A crossing determination apparatus comprising:

an object detection unit which detects an object moving in a direction perpendicular to a traveling path of an own vehicle;

a crossing speed calculation unit which calculates a crossing speed that is a speed at which the object detected by the objection detection unit is crossing a current traveling path of the own vehicle;

a crossing determination unit which, when the crossing speed calculated by the crossing speed calculation unit is higher than a predetermined speed, determines that the object is crossing the traveling path of the own vehicle; and a yaw rate detection unit which detects a yaw rate of the own vehicle, wherein:

the crossing determination unit corrects the crossing speed of the object or the predetermined speed based on the yaw rate detected by the yaw rate detection unit; and when the own vehicle turns in a direction away from the object, the crossing determination unit is more likely to determine that the object is crossing the traveling path of the own vehicle than when the own vehicle does not turn in the direction away from the object.

7. A crossing determination apparatus comprising:

an object detection unit which detects an object moving in a direction perpendicular to a traveling path of an own vehicle;

an amount-of-movement calculation unit which calculates an amount of movement of the object detected by the object detection unit, the object having moved in a direction crossing a current traveling path of the own vehicle with a lapse of a predetermined time;

a crossing determination unit which, when the amount of movement of the object calculated by the amount-of-movement calculation unit is greater than a predetermined amount of movement, determines that the object is crossing the traveling path of the own vehicle; and a yaw rate detection unit which detects a yaw rate of the own vehicle, wherein:

the crossing determination unit corrects the amount of movement of the object or the predetermined amount of movement based on the yaw rate detected by the yaw rate detection unit; and when the own vehicle turns in a direction away from the object, the crossing determination unit is more likely to determine that the object is crossing the traveling path of the own vehicle than when the own vehicle does not turn in the direction away from the object.

8. The crossing determination apparatus according to claim 7, wherein the crossing determination unit corrects the amount of movement of the object or the predetermined amount of movement to reduce a probability of determining the object as crossing on a condition that the own vehicle turns toward the object with respect to the current traveling path and the yaw rate detected by the yaw rate detection unit is higher than a predetermined value.

* * * * *